United States Patent
Kato et al.

(10) Patent No.: US 7,040,285 B2
(45) Date of Patent: May 9, 2006

(54) KNOCKING CONTROL APPARATUS AND KNOCKING CONTROL METHOD FOR INTERNAL COMBUSTION ENGINE

(75) Inventors: Toshikazu Kato, Toyota (JP); Yuji Miyanoo, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/121,050

(22) Filed: May 4, 2005

(65) Prior Publication Data

US 2005/0257760 A1 Nov. 24, 2005

(30) Foreign Application Priority Data

May 20, 2004 (JP) .............................. 2004-150742

(51) Int. Cl.
*F02P 5/152* (2006.01)
*F01L 1/34* (2006.01)
(52) U.S. Cl. .............................. 123/406.37; 73/35.03; 123/90.15; 123/406.29
(58) Field of Classification Search .............. 123/90.11, 123/90.15, 406.21, 406.22, 406.29–406.43, 123/435; 73/35.03–35.05
See application file for complete search history.

(56) References Cited

U.S. PATENT DOCUMENTS

| | | | | |
|---|---|---|---|---|
| 4,960,094 A | * | 10/1990 | Koike et al. | 123/406.29 |
| 6,736,109 B1 | * | 5/2004 | Hoshino | 123/406.29 |
| 6,877,482 B1 | * | 4/2005 | Kinose | 123/406.29 |
| 2004/0158388 A1 | * | 8/2004 | Fujiwara et al. | 123/406.35 |

FOREIGN PATENT DOCUMENTS

| | | |
|---|---|---|
| JP | A B2 2666081 | 11/1990 |
| JP | A B2 2666082 | 11/1990 |
| JP | A 10-159642 | 6/1998 |
| JP | A 2002-221054 | 8/2002 |

* cited by examiner

*Primary Examiner*—Tony M. Argenbright
(74) *Attorney, Agent, or Firm*—Kenyon & Kenyon LLP (57) ABSTRACT

A knocking control apparatus for an internal combustion engine, which is applied to an internal combustion engine including a variable valve mechanism that can vary a valve characteristic of at least one of an intake valve and an exhaust valve, and which changes an engine control amount based on a result of a knocking determination as to whether knocking occurs, includes a controller which performs the knocking determination as to whether knocking occurs based on an output signal from a knock sensor that detects a vibration occurring in the internal combustion engine, and which changes a mode of the knocking determination according to a change in a combustion state of an air-fuel mixture, the change being caused by a change in the valve characteristic.

16 Claims, 9 Drawing Sheets

KNOCKING CONTROL APPARATUS AND KNOCKING CONTROL METHOD FOR INTERNAL COMBUSTION ENGINE

INCORPORATION BY REFERENCE

The disclosure of Japanese Patent Application No. 2004-150742 filed on May 20, 2004, including the specification, drawings and abstract is incorporated herein by reference in its entirety.

BACKGROUND OF THE INVENTION

1. Field of the Invention

The invention relates to a knocking control apparatus and knocking control method for an internal combustion engine including a variable valve mechanism which can vary a valve characteristic of at least one of an intake valve and an exhaust valve.

2. Description of the Related Art

An internal combustion engine is known, which includes a variable valve mechanism that can vary a valve characteristic, for example, opening/closing timing and a lift amount of an intake valve and/or an exhaust valve, according to an engine operating state.

Meanwhile, in an internal combustion engine, a knocking determination as to whether knocking occurs is generally performed. On the basis of the result of the knocking determination, knocking control is performed to adjust an engine control amount such as ignition timing. This knocking determination is performed using a knock sensor which is provided in a cylinder block or the like for detecting vibrations. On the basis of an output signal from the knock sensor after ignition at each cylinder, it is determined whether knocking occurs.

In the internal combustion engine including the aforementioned variable valve mechanism, an occurrence mode of seating noise, that is, a mode in which seating noise occurs when the intake valve or exhaust valve is closed is changed due to a change in the valve characteristic. In other words, for example, occurrence timing, a vibration level, or a vibration frequency of the seating noise is changed due to the change in the valve characteristic. As a result, this seating noise may be detected as knocking. Accordingly, in a conventional knocking control apparatus for an internal combustion engine including a variable valve mechanism, a mode of the knocking determination is changed according to the change in the valve characteristic so as to prevent such seating noise from being detected as knocking.

For example, in a knocking control apparatus disclosed in Japanese Patent Application Publication No. JP(A)2002-221054, vibration frequencies of an engine that are detected by a knock sensor are subjected to a filtering process so that a vibration frequency indicating occurrence of knocking is extracted. The vibration frequency that is extracted during this filtering process (hereinafter, referred to as "knocking detection frequency") is changed according to the change in the valve characteristic. Thus, a vibration frequency which is caused due to seating of the valve is prevented from being misjudged as the vibration frequency of knocking. Also, various proposals are made, in which a determination period or a determination level is changed according to the change in the valve characteristic.

Meanwhile, when the valve characteristic of the intake valve or the exhaust valve is changed, an air-intake state and the like are changed. Therefore, a combustion state of an air-fuel mixture may be also changed. Thus, an occurrence mode of knocking, for example, occurrence timing of knocking, a vibration level of knocking, or a vibration frequency caused by knocking may be also changed. In the aforementioned conventional knocking control apparatus, although it is possible to appropriately reduce influence of the seating noise of the intake valve or exhaust valve on the knocking determination, it is not possible to cope with a change in the occurrence mode of knocking, which is caused by the change in the combustion state. Accordingly, in the case where the valve characteristic is changed, it may be determined that knocking occurs even when knocking does not occur. Also, it may be determined that knocking does not occur even when knocking occurs. That is, reliability of the result of the knocking determination performed in the internal combustion engine including the variable valve mechanism may be reduced, which may adversely affect adjustment of the engine control amount. Therefore, further improvement is required.

SUMMARY OF THE INVENTION

In view of the above, a knocking control apparatus and knocking control method for an internal combustion engine is provided, which can prevent a decrease in reliability of a result of knocking determination in an internal combustion engine including a variable valve mechanism.

An aspect of the invention relates to a knocking control apparatus for an internal combustion engine, which is applied to an internal combustion engine including a variable valve mechanism that can vary a valve characteristic of at least one of an intake valve and an exhaust valve, and which changes an engine control amount based on a result of a knocking determination as to whether knocking occurs. The knocking control apparatus includes a controller which performs the knocking determination as to whether knocking occurs based on an output signal from a knock sensor that detects a vibration occurring in the internal combustion engine, and which changes a mode of the knocking determination according to a change in a combustion state of an air-fuel mixture, the change being caused by a change in the valve characteristic.

Another aspect of the invention relates to a knocking control method for an internal combustion engine, which is applied to an internal combustion engine including a variable valve mechanism that can vary a valve characteristic of at least one of an intake valve and an exhaust valve, and which includes changing an engine control amount based on a result of a knocking determination as to whether knocking occurs. The knocking control method includes performing the knocking determination as to whether knocking occurs based on an output signal from a knock sensor that detects a vibration occurring in the internal combustion engine; and changing a mode of the knocking determination according to a change in a combustion state of an air-fuel mixture, the change being caused by a change in the valve characteristic.

In the aforementioned control apparatus and control method, the mode of the knocking determination is changed according to the change in the combustion state of the air-fuel mixture, which is caused by the change in the valve characteristic. Therefore, even when an occurrence mode of knocking is changed due to the change in the valve characteristic, the mode of the knocking determination is changed according to the change in the occurrence mode of knocking. Accordingly, it is possible to appropriately detect occurrence of knocking in the internal combustion engine whose valve characteristic is variably set. Thus, it is possible to prevent a decrease in reliability of the result of the knocking determination.

BRIEF DESCRIPTION OF THE DRAWINGS

The above-mentioned and other features, advantages, technical and industrial significance of this invention will be better understood by reading the following detailed description of the exemplary embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments. Hereinafter, a knocking control apparatus for an internal combustion engine according to an embodiment of the invention will be described with reference to FIG. 1 to FIG. 12.

Figure 1:
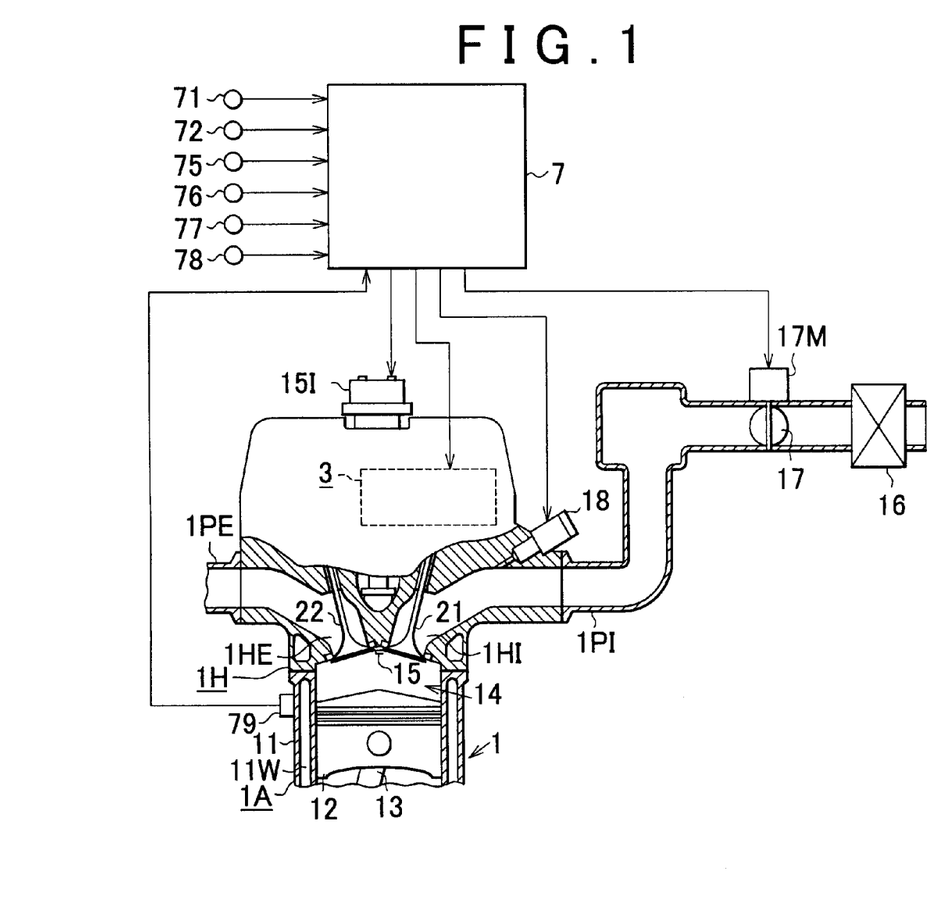
FIG. 1 is a schematic diagram showing an overall configuration of a knocking control apparatus for an internal combustion engine according to an embodiment of the invention.

FIG. 1 is a diagram showing a configuration of an engine 1 according to the embodiment of the invention. In this embodiment, it is assumed that a port injection engine in which fuel is injected into an intake port is employed. However, the invention can be applied also to an in-cylinder injection engine in which fuel is directly injected into a combustion chamber.

An engine 1 includes an engine main body 1A; a cylinder head 1H; a variable valve mechanism 3; and the like. The engine main body 1A includes a cylinder 11, a piston 12, and the like. The cylinder head 1H includes an intake valve, an exhaust valve, and the like. The variable valve mechanism 3 can vary a valve characteristic of the intake valve provided in the engine 1.

In the engine main body 1A, the piston 12 is provided in the cylinder 11 such that the piston 12 can be reciprocated. The piston 12 is connected to a crankshaft through a connecting rod 13.

A water jacket 11W is formed around the cylinder 11. Coolant for the engine 1 flows in the water jacket 11W. In the engine 1, a combustion chamber 14 is formed in a region surrounded by an inner peripheral surface of the cylinder 11, a top surface of the piston 12, and the cylinder head 1H.

The cylinder head 1H is provided with an intake port 1HI, and an exhaust port 1HE. Intake air flows into the combustion chamber 14 through the intake port 1HI. Exhaust gas flows out of the combustion chamber 14 through the exhaust port 1HE. An ignition plug 15 for igniting an air-fuel mixture is provided in the cylinder head 1H on a combustion chamber 14 side. The ignition plug 15 is connected to an igniter 151 which generates high-voltage electric current required for igniting the air-fuel mixture.

An intake pipe 1PI is connected to the intake port 1HI. Intake air flows from the outside of the engine 1 to the combustion chamber 14 through the intake pipe 1PI. In the intake pipe 1PI, an air cleaner 16 for purifying intake air, and a throttle valve 17 for adjusting a flow rate of intake air are provided. An opening amount of the throttle valve 17 is changed when a throttle motor 17M drives a valve shaft.

The intake port 1HI is opened/closed by an intake valve 21. The intake valve 21 is an engine valve on an intake side, which is provided in the cylinder head 1H. An injector 18 for injecting fuel into the intake port 1HI is provided on an upstream side of the intake valve 21 for the intake port 1HI.

An exhaust pipe 1PE is connected to the exhaust port 1HE. Exhaust gas flows from the combustion chamber 14 to the outside of the engine 1 through the exhaust port 1PE. This exhaust port 1HE is opened/closed by an exhaust valve 22. The exhaust valve 22 is an engine valve on an exhaust side, which is provided in the cylinder head 1H.

The valve characteristic of the intake valve 21 of the engine 1 including a lift amount and a working angle is changed through driving of the variable valve mechanism 3. The working angle decides a valve opening period of the intake valve 21, that is, valve opening timing and valve closing timing of the intake valve 21.

The engine 1 is controlled by an electronic control unit 7. The electronic control unit 7 includes a CPU, memory, an input port, and an output port. The CPU performs various processes relating to control of the engine 1. The memory stores programs for the control, and information required for the control. The input port and the output port control input of signals from the outside and output of signals to the outside. Various sensors for detecting an operating state of the engine 1, which are described below, are connected to an input port of the electronic control unit 7.

First, an engine coolant sensor 71 detects a temperature of coolant for the engine 1. A crank angle sensor 72 detects a rotational phase (crank angle) of the crankshaft. Based on the signal, a rotational speed of the crankshaft (engine rotational speed NE) is calculated. An air flow meter 75 detects an air amount taken into the engine 1 (intake air amount GA). A vehicle speed sensor 76 detects a rotational speed of a drive wheel of a vehicle. An accelerator pedal operation amount sensor 77 detects an operation amount of an accelerator pedal of a vehicle (accelerator pedal operation amount ACCP). A throttle valve opening amount sensor 78 detects an opening amount of the throttle valve 17 (throttle valve opening amount TA). A knock sensor 79 provided in the cylinder block constituting the cylinder of the engine 1 detects vibrations transmitted to the cylinder block.

The igniter 15I, the throttle motor 17M, the injector 18, a drive mechanism of the variable valve mechanism 3, and the like are connected to the output port of the electronic control unit 7. The electronic control unit 7 controls these devices based on the engine operating state detected by the aforementioned various sensors.

Next, a configuration and a drive mode of the variable valve mechanism 3 will be described with reference to FIG. 2 to FIG. 6. The variable valve mechanism 3 includes a valve drive mechanism 4, and the like. A configuration of the valve drive mechanism 4 will be described with reference to FIG. 2 and FIG. 3.

Figure 2:
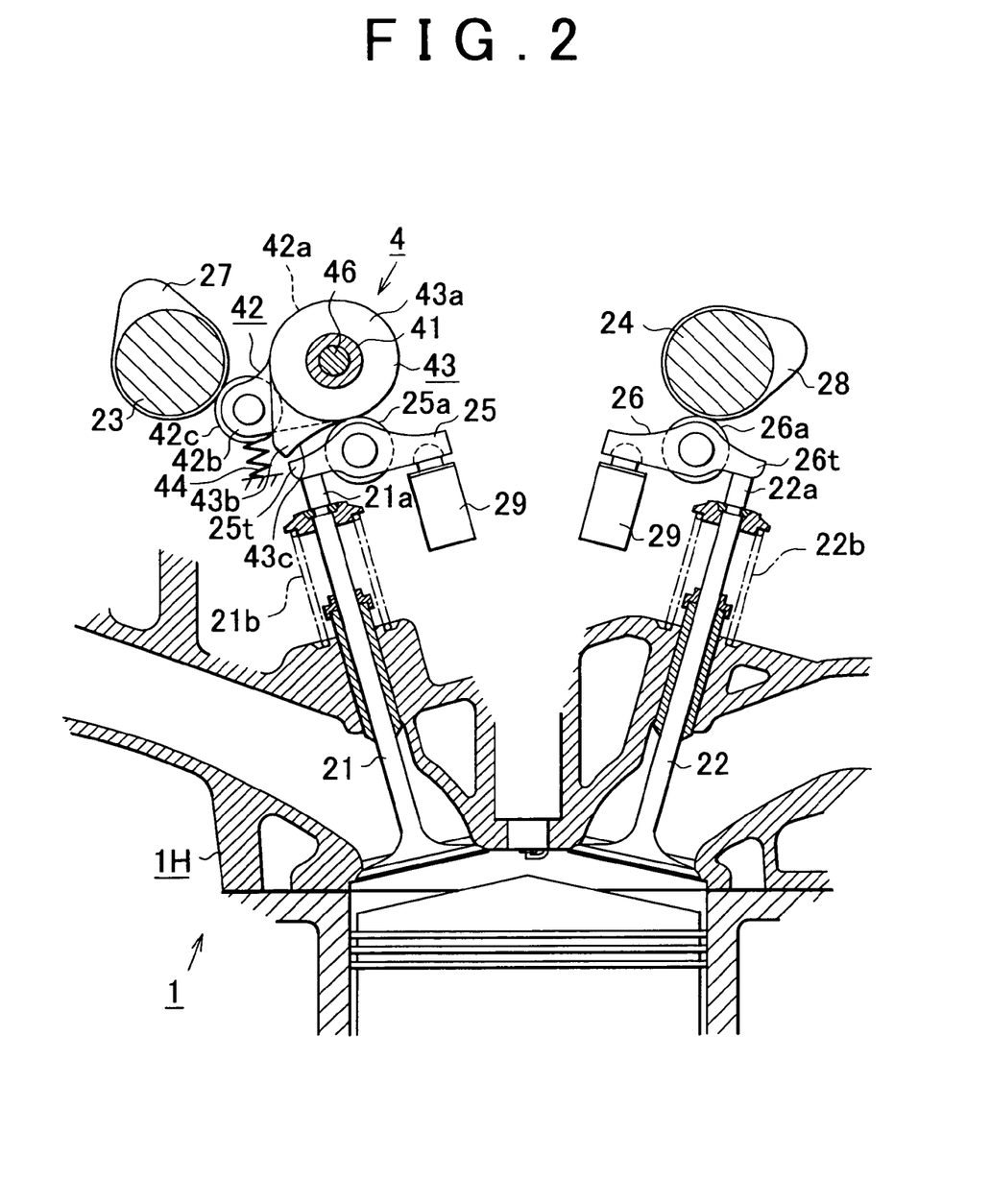
FIG. 2 is a diagram showing a configuration of a variable valve mechanism according to the embodiment of the invention.

FIG. 2 shows a cross sectional structure of an upper portion of the engine 1 in which the variable valve mechanism 3 is provided. In the cylinder head 1H of the engine 1, an intake cam shaft 23 and an exhaust cam shaft 24 are connected to the crankshaft so as to be driven by the crankshaft, and are supported so as to be rotatable.

A roller rocker arm 26 including a roller 26a is provided below the exhaust cam shaft 24. The roller 26a contacts an exhaust cam 28 provided in the exhaust cam shaft 24. The roller 26a is pressed by the exhaust cam 28 according to the rotational phase of the exhaust cam 28.

One end of the roller rocker arm 26 is supported by a lash adjuster 29 fixed to the cylinder head 1H. Another end thereof contacts a tappet 22a at an upper end of the exhaust valve 22. A valve spring 22b of the exhaust valve 22 applies force to an end portion of the roller rocker arm 26 on a tappet 22a side (tappet side end portion 26t). Thus, the roller 26a always contacts the exhaust cam 28.

The exhaust valve 22 is pressed by the exhaust cam 28 through the roller rocker arm 26 provided in the aforementioned manner, and is opened/closed such that the lift amount is always constant. Meanwhile, the variable valve mechanism 3 (valve drive mechanism 4) is provided between an intake cam 27 provided on the intake cam shaft 23 and a roller rocker arm 25.

The roller rocker arm 25 includes a roller 25a, and is provided below the valve drive mechanism 4. One end of the roller rocker arm 25 is supported by the lash adjuster 29 fixed to the cylinder head 1H. Another end thereof contacts a tappet 21a at an upper end of the intake valve 21. A valve spring 21b of the intake valve 21 applies force to an end portion of the roller rocker arm 25 on a tappet 21a side (tappet side end portion 25t). Thus, the roller 25a always contacts the valve drive mechanism 4.

Pressure applied by the intake cam 27 is transmitted to the intake valve 21 through the valve drive mechanism 4 and the roller rocker arm 25. The valve drive mechanism 4 includes a support pipe 41 fixed to the cylinder head 1H, and an input portion 42 and an oscillating cam 43 that are provided on the support pipe 41.

The input portion 42 and the oscillating cam 43 include a cylindrical housing 42a and a cylindrical housing 43a, respectively. The housing 42a and the housing 43a are provided on the support pipe 41 such that the housing 42a and the housing 43a can be oscillated around an axis of the support pipe 41. In the valve drive mechanism 4, one input portion 42 and two oscillating cams 43 are provided for two intake valves 21 provided in the cylinder of the engine 1.

An input arm 42b is formed in the housing 42a of the input portion 42 so as to radially protrude. A roller 42c which contacts the intake cam 27 is rotatably supported at an end portion of the input arm 42b. Also, a spring 44 provided in a compressed state applies force to the end portion of the input arm 42b so that the roller 42c is pressed against the intake cam 27.

An output arm 43b is formed in the housing 43a of the oscillating cam 43 so as to radially protrude. One surface of the output arm 43b is a cam surface 43c which has a curved concave shape. The cam surface 43c is smoothly continuous with an outer peripheral surface of the housing 43a at a base circle portion thereof, that is, at a portion other than a portion where the output arm 43b is formed to protrude. The cam surface 43c and the base circle portion of the housing 43a contact the roller 25a of the roller rocker arm 25.

Figure 3:
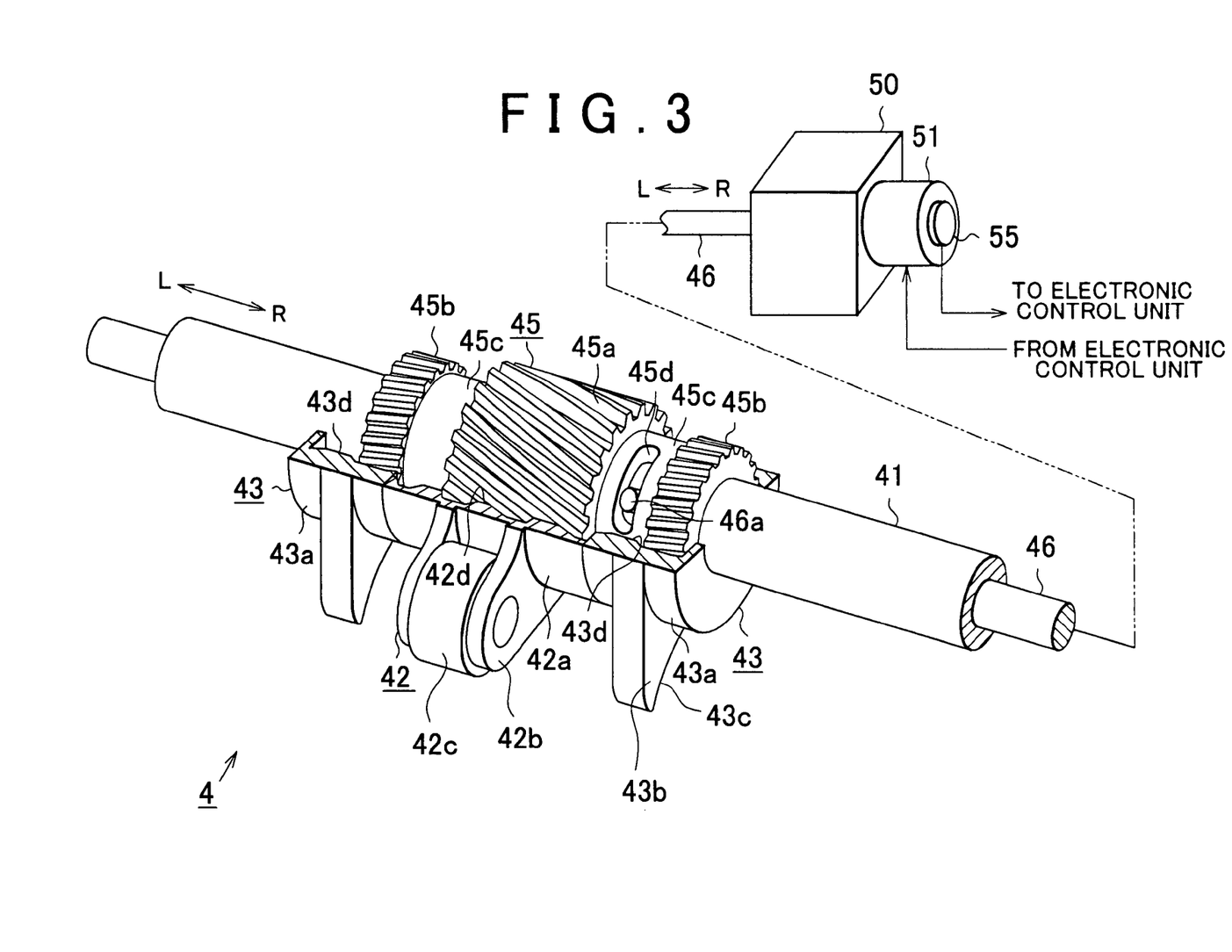
FIG. 3 is a perspective cross sectional view showing a configuration of a valve drive mechanism according to the embodiment of the invention.

FIG. 3 shows a perspective cross sectional structure of the valve drive mechanism 4. In the valve drive mechanism 4, two oscillating cams 43 are provided with the input portion 42 being provided therebetween.

Each of the housing 42a of the input portion 42 and the housing 43a of the oscillating cam 43 is formed to have a hollow cylindrical shape. The support pipe 41 is inserted in the housings 42a and 43a. A helical spline 42d with a right-hand spiral is formed in an inner periphery of the housing 42a of the input portion 42. Meanwhile, a helical spline 43d with a left-hand spiral is formed in an inner periphery of the housing 43a of the oscillating cam 43.

A slider gear 45 is provided in a space defined by the housing 42a of the input portion 42 and the housings 43a of the two oscillating cams 43. The slider gear 45 is formed so as to have a substantially hollow cylindrical shape. The slider gear 45 is provided on the support pipe 41 such that the slider gear 45 can be reciprocated in an axial direction of the support pipe 41, and can be oscillated around an axis of the support pipe 41 with respect to the support pipe 41.

A helical spline 45a with a right-hand spiral is formed on an outer peripheral surface of a center portion of the slider gear 45 in an axial direction. The helical spline 45a is engaged with the helical spline 42d formed in the inner periphery of the housing 42a of the input portion 42. Meanwhile, a helical spline 45b with a left-hand spiral is formed on an outer peripheral surface of each of both end portions of the slider gear 45 in the axial direction. The helical spline 45b is engaged with the helical spline 43d formed in the inner periphery of the housing 43a of each oscillating cam 43.

A small-diameter portions 45c is formed between the helical spline 45a and one of the helical splines 45b, and another small-diameter portion 45c is formed between the helical spline 45a and the other helical spline 45b, the helical spline 45a and the helical splines 45b being formed on the outer periphery of the slider gear 45. The small-diameter portion 45c has an outer diameter that is smaller than an outer diameter of the helical spline 45a and an outer diameter of the helical spline 45b. A long hole 45d extending in a circumferential direction is formed in one of the small-diameter portions 45c.

A control shaft 46 is inserted in the support pipe 41 so as to be slidable in the axial direction thereof. The control shaft 46 can be reciprocated in the axial direction (in a direction indicated by an arrow) with respect to the support pipe 41 by operation of the slide actuator 50.

The slide actuator 50 is provided with a driving motor 51 which is controlled by control voltage from the electronic control unit 7, a mechanism for moving the control shaft 46 by converting rotational movement of the driving motor 51 to linear movement, and the like. A position of the control shaft 46 is controlled by controlling a rotational phase R of the driving motor 51.

Also, the slide actuator 50 is provided with a position detection sensor 55 for detecting the position of the control shaft 46, more specifically an amount of movement of the control shaft 46 from an initial position. Detected data is input to the electronic control unit 7. That is, the position detection sensor 55 detects an operating state of the variable valve mechanism 3, that is, a valve characteristic of the intake valve 21. In this embodiment, the aforementioned position detection sensor 55 detects the rotational phase R of the driving motor 51. The valve characteristic of the intake valve 21, that is, a working angle θ thereof is changed according to a change in the rotational phase R. Accordingly, in this embodiment, the working angle θ of the intake valve 21 is detected based on the rotational phase R.

A holding pin 46a is formed on the control shaft 46 shown in FIG. 3 so as to radially protrude. The holding pin 46a is inserted in the long hole 45d through a long hole that is formed in the support pipe 41 so as to extend in the axial direction thereof. Thus, while the slider gear 45 is allowed to be oscillated with respect to the support pipe 41, the slider gear 45 can be moved in the axial direction according to the reciprocating movement of the control shaft 46 in the axial direction.

In the valve drive mechanism 4 thus configured, the lift amount and the working angle θ of the intake valve 21 can be continuously varied according to the movement of the control shaft 46 in the axial direction caused by the slide actuator 50. Hereinafter, an operating mode of the valve drive mechanism 4 will be described with reference to FIGS. 4A and 4B, and FIGS. 5A and 5B.

Figure 4A:
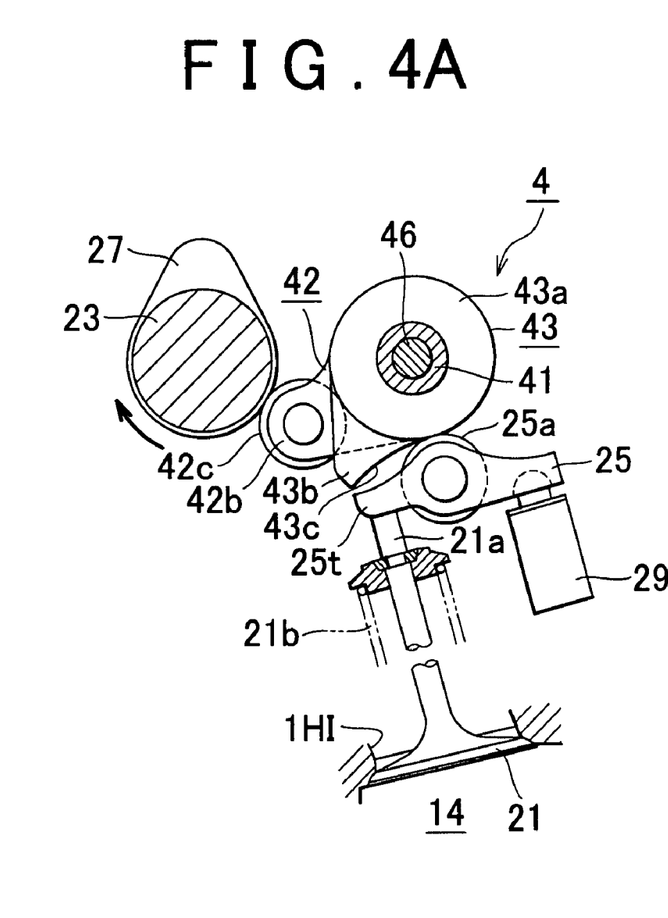
FIG. 4A and FIG. 4B are diagrams each showing an operating mode of the valve drive mechanism according to the embodiment of the invention.

First, referring to FIGS. 4A and 4B, description will be made of the operating state of the valve drive mechanism 4 in a case where the control shaft 46 is moved in an R direction (in a direction indicated by an arrow R in FIG. 3) to the fullest extent. FIG. 4A shows the operating state of the valve drive mechanism 4 in the case where a base circle portion of the intake cam 27 contacts the roller 42c of the input portion 42 of the valve drive mechanism 4.

In the state shown in FIG. 4A, the roller 25a of the roller rocker arm 25 does not contact the output arm 43b of the oscillating cam 43, but contacts the base circle portion of the housing 43a adjacent to the output arm 43b.

At this time, the intake valve 21 closes the intake port 1HI. When the intake cam shaft 23 is rotated and a lift portion of the intake cam 27 pushes the roller 42c of the input portion 42 downward, the input portion 42 is oscillated with respect to the support pipe 41 in a counterclockwise direction (a direction indicated by an arrow) in FIG. 4A. Accordingly, the slider gear 45 and the oscillating cam 43 are integrally oscillated.

Thus, the cam surface 43c formed in the output arm 43b of the oscillating cam 43 contacts the roller 25a of the roller rocker arm 25, and the roller 25a is pushed downward by the cam surface 43c.

Figure 4B:
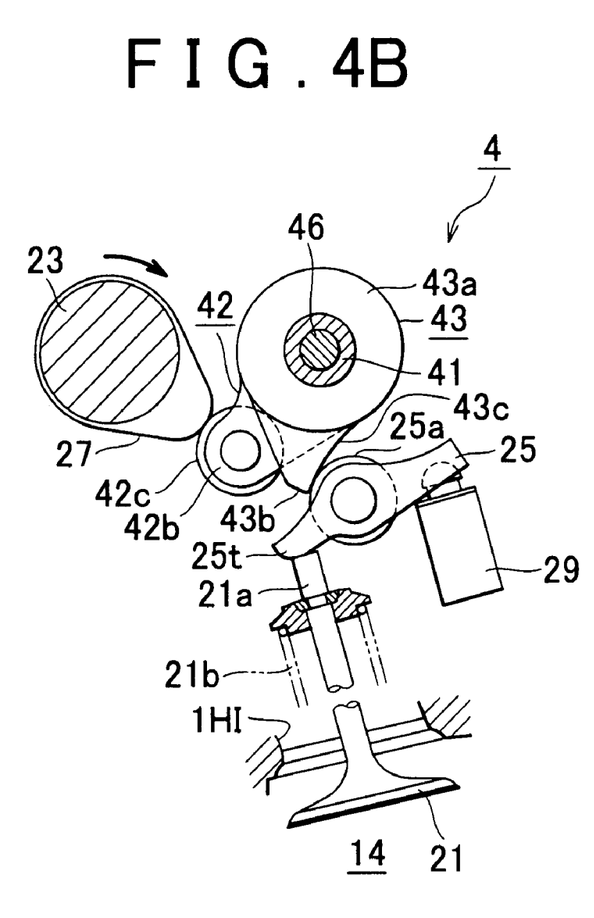

FIG. 4B shows the operating state of the valve drive mechanism 4 in the case where the cam surface 43c of the output arm 43b contacts the roller 25a of the roller rocker arm 25. Since the roller 25a is pressed through the cam surface 43c, the roller rocker arm 25 is oscillated around a contact portion between the roller rocker arm 25 and the lash adjuster 29. The intake valve 21 is opened through this oscillation.

In the case where the control shaft 46 is moved in the R direction (in the direction indicated by the arrow R in FIG. 3) to the fullest extent, relative positions of the input arm 42b and the output arm 43b around the axis of the support pipe 41 are furthest from each other. This maximizes a displacement amount of the roller 25a of the roller rocker arm 25 at a time when the intake cam 27 pushes the roller 42c of the input portion 42 downward to the fullest extent. Therefore, the intake valve 21 is opened/closed with the working angle being largest, and the lift amount being largest.

In the aforementioned valve drive mechanism 4, when the control shaft 46 is displaced in the axial direction by the slide actuator 50, the slider gear 45 is also displaced in the axial direction in association with the displacement of the control shaft 46. Then, the input portion 42 and the oscillating cam 43 that are engaged with the slider gear 45 through the splines are oscillated with respect to the slider gear 45 according to the displacement of the slider gear 45.

At this time, the input portion 42 is oscillated in a direction opposite to a direction in which the oscillating cam 43 is oscillated since directions of the helical splines in the input portion 42 and the oscillating cam 43 are opposite to each other. Therefore, the relative positions of the input arm 42b and the output arm 43b around the axis of the support pipe 41 are changed.

Figure 5A:
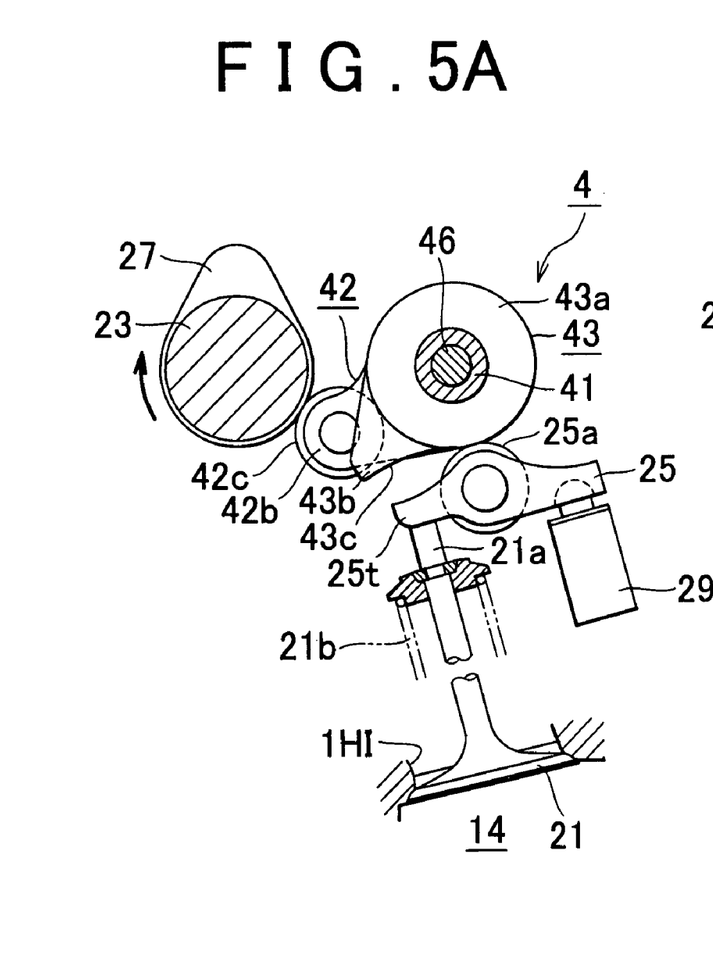
FIG. 5A and FIG. 5B are diagrams each showing an operating mode of the valve drive mechanism according to the embodiment of the invention.

Next, referring to FIGS. 5A and 5B, description will be made of the operating state of the valve drive mechanism 4 in a case where the control shaft 46 is moved in an L direction (in a direction indicated by an arrow L in FIG. 3) to the fullest extent. FIG. 5A shows the operating state of the valve drive mechanism 4 in the case where the base circle portion of the intake cam 27 contacts the roller 42c of the input portion 42. At this time, a portion of the oscillating cam 43 which contacts the roller 25a is furthest from the cam surface 43c.

When the intake cam shaft 23 is rotated, and the lift portion of the intake cam 27 pushes the roller 42c of the input portion 42 downward, the oscillating cam 43 and the input portion 42 are integrally oscillated. However, in this case, since the portion of the oscillating cam 43 which contacts the roller 25a is furthest from the cam surface 43c in the state shown in FIG. 5A as described above, an amount of rotation of the oscillating cam 43 until the roller 25a starts to be pushed downward by the cam surface 43c is large as compared to the operating state shown in FIGS. 4A and 4B. Also, when the lift portion of the intake cam 27 pushes the roller 42c of the input portion 42 downward, a region of the cam surface 43c which contacts the roller 25a is reduced to only one portion of the output arm 43b at a base end thereof. This reduces an amount of oscillation of the roller rocker arm 25 caused when the lift portion of the intake cam 27 pushes the roller 42c downward.

Figure 5B:
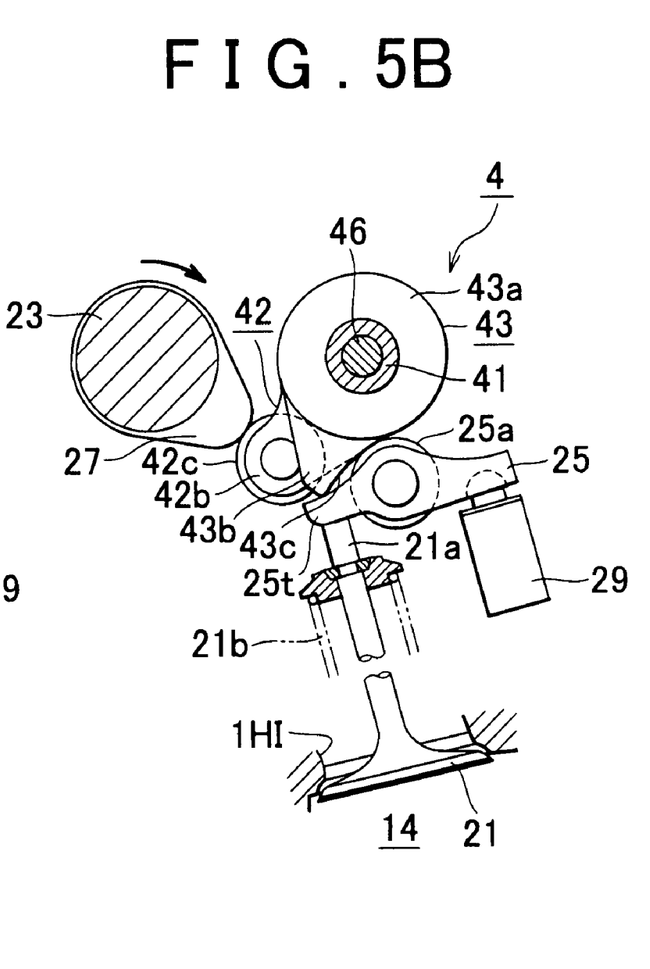

FIG. 5B shows the operating state in the case where the cam surface 43c of the output arm 43b contacts the roller 25a of the roller rocker arm 25. As shown in FIGS. 5A and 5B, since the amount of oscillation of the roller rocker arm 25 is small, the intake valve 21 is opened with the lift amount being smaller.

In this case, since the control shaft 46 is moved in the L direction (in the direction indicated by the arrow L in FIG. 3) to the fullest extent, the relative positions of the input arm 42b and the output arm 43b around the axis of the support pipe 41 are closest to each other. This minimizes the displacement amount of the roller 25a of the roller rocker arm 25 at the time when the intake cam 27 pushes the roller 42c of the input portion 42 to the fullest extent. Therefore, the intake valve 21 is opened/closed with the working angle being smallest, and the lift amount being smallest.

Figure 6:
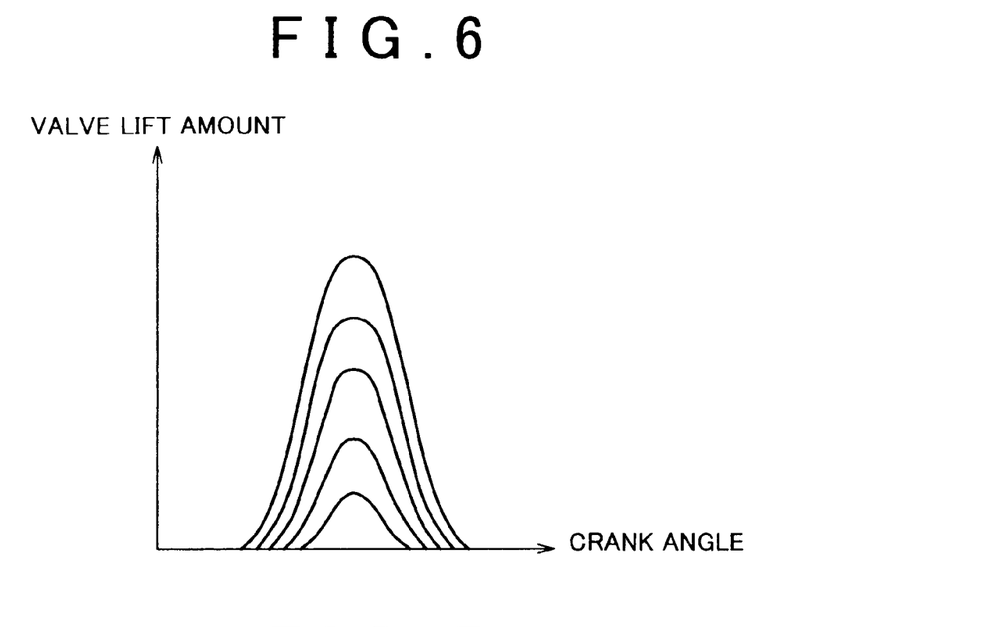
FIG. 6 is a diagram showing a mode in which a lift amount and a working angle of a valve are variably set by the variable valve mechanism according to the embodiment of the invention.

Thus, in the variable valve mechanism 3 (valve drive mechanism 4), the mode of oscillation of the roller rocker arm 25 is changed by changing the relative positions of the input arm 42b and the output arm 43b around the axis of the support pipe 41. Thus, the lift amount and the working angle θ (the opening valve period) of the intake valve 21 can be continuously varied as shown in FIG. 6. In this variable valve mechanism 3, the working angle θ of the intake valve 21 is changed according to a change in the lift amount of the intake valve 21.

The working angle θ of the intake valve 21 is changed by the variable valve mechanism 3 through control performed by the electronic control unit 7. That is, the electronic control unit 7 calculates a target working angle that is a target value in the control of the working angle θ, according to the engine operating state. Control voltage Vg for the driving motor 51 is controlled so that the control shaft 46 is moved according to the target working angle. The control voltage Vg is controlled through feedback, according to deviation between the actual rotational phase R detected by the position detection sensor 55 and a target rotational phase corresponding to the target working angle.

In this embodiment, basically, the target working angle is set based on the engine rotational speed NE and an engine load L (which is calculated based on the intake air amount GA, the accelerator pedal operation amount ACCP, the throttle valve opening amount TA, and the like). As the working angle θ is decreased, and closing timing of the intake valve 21 is advanced, pumping loss can be reduced. Accordingly, when it is required to reduce the pumping loss, the target working angle is set to a value different from a value of the target working angle when it is not required to reduce the pumping loss, even in a case where the engine rotational speed NE and the engine load L are not changed. More specifically, when it is required to reduce the pumping loss, the target working angle is set to a value smaller than a value of the target working angle when it is not required to reduce the pumping loss.

Next, description will be made of ignition timing control for the engine 1 performed by the electronic control unit 7. The electronic control unit 7 performs a knocking determination as to whether knocking occurs in each cylinder, based on a result of detection performed by the knock sensor 79. Then, the electronic control unit 7 performs knocking control for adjusting the ignition timing based on the result of the knocking determination.

More specifically, when it is determined that knocking occurs in the knocking determination, final ignition timing AOP is delayed by a predetermined amount. When it is determined that knocking does not occur, the final ignition timing AOP is gradually advanced. The final ignition timing AOP is timing at which ignition is performed at each cylinder, which is represented by a crank angle (BTDC) with respect to a compression top dead center of each cylinder. The final ignition timing AOP is calculated using an equation (1) described below.

$$AOP = ABASE - (AKMAX - AGKNK + AKCS) \quad (1)$$

In this equation (1), AOP is the final ignition timing, ABASE is basic ignition timing, AKMAX is the largest delay amount, AGKNK is a knocking learning amount, and AKCS is a feedback correction amount. The basic ignition timing ABASE is ignition timing which makes it possible to obtain the largest engine output on the assumption that knocking does not occur. Also, the largest delay amount AKMAX is a correction amount used for delaying the basic ignition timing ABASE by correction so that occurrence of knocking can be reliably prevented. The basic ignition timing ABASE and the largest delay amount AKMAX are set based on the engine operating state, for example, the engine rotational speed NE and the engine load L.

Also, in the equation (1), the feedback correction amount AKCS and the knocking learning amount AGKNK are correction amounts used for delaying the final ignition timing AOP by correction according to occurrence of knocking so as to prevent occurrence of knocking. The feedback correction amount AKCS and the knocking learning amount AGKNK are increased or decreased according to whether knocking occurs.

When knocking occurs, the feedback correction amount AKCS is changed such that the final ignition timing AOP is delayed. When knocking does not occur, the feedback correction amount AKCS is changed such that the final ignition timing AOP is advanced.

Meanwhile, the knocking learning amount AGKNK is changed so that the feedback correction amount AKCS enters a predetermined range. When the feedback correction amount AKCS is out of the predetermined range and the final ignition timing AOP needs to be delayed, the knocking learning amount AGKNK is changed so that the final ignition timing AOP is delayed. When the feedback correction amount AKCS is out of the predetermined range and the final ignition timing AOP needs to be advanced, the knocking learning amount AGKNK is changed so that the final ignition timing AOP is advanced.

The electronic control unit 7 outputs an ignition signal to an igniter 19 of each cylinder, and performs ignition. The ignition signal is turned on at the final ignition timing AOP thus calculated. Thus, the ignition timing is adjusted to be close to a range where knocking occurs.

Figure 7:
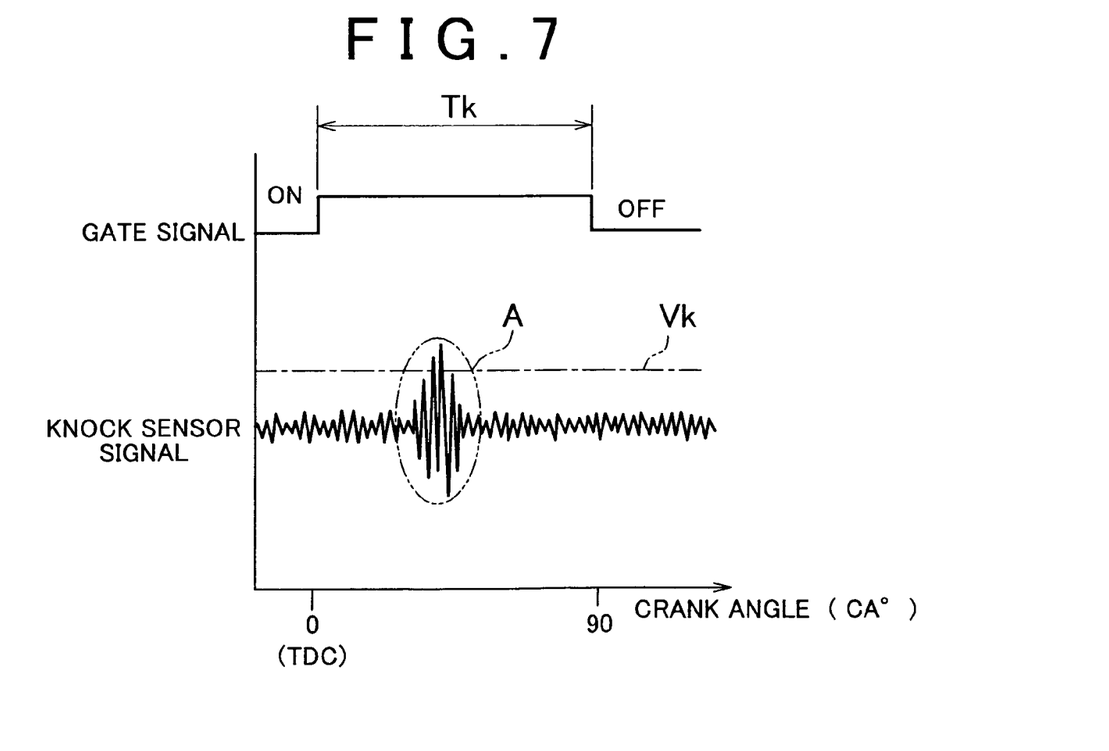
FIG. 7 is a time chart showing an example of a mode of a knocking determination in the embodiment of the invention.

Next, the knocking determination in the knocking control will be described. FIG. 7 shows an example of a mode of the knocking determination in the embodiment. In FIG. 7, an output signal from the knock sensor 79 (knock sensor signal) is shown. The output signal surrounded by a circle A is a knocking signal that is detected by the knock sensor 79 when knocking occurs.

Since the knock sensor 79 detects various vibrations, the output signal from the knock sensor 79 is subjected to a filtering process in this embodiment, in order to extract a vibration component caused by occurrence of knocking. In this filtering process, a knocking detection frequency H is set so as to be used for extracting a vibration frequency of knocking, from the output signal from the knock sensor 79. The signal obtained as a result of the filtering process is used as the output signal from the knock sensor 79. In other words, the signal having an amplitude of the knocking detection frequency H, that is, the signal showing a vibration level of the knocking detection frequency H is used as the output signal from the knock sensor 79. The knocking determination is performed based on whether the output signal from the knock sensor 79 that is sampled during a knocking determination period Tk exceeds a knocking determination level Vk.

In order to appropriately determine whether knocking occurs, it is necessary to set the knocking determination period Tk, the knocking determination level Vk, the knocking detection frequency H, and the like, according to the occurrence mode of knocking, that is, the occurrence timing, the vibration level, the vibration frequency, and the like of the knocking. In this embodiment, the knocking determination period Tk, the knocking determination level Vk, and the knocking detection frequency H are set according to the engine operating state relating to the occurrence mode of knocking, that is, the engine rotational speed NE and the engine load L.

Meanwhile, the engine 1 includes the variable valve mechanism which can vary the valve characteristic of the intake valve 21, that is, the working angle θ. When the working angle θ is changed, a combustion state of the air-fuel mixture is also changed. Thus, the occurrence mode of knocking is also changed. Accordingly, in this embodiment, the mode of the knocking determination, more specifically, the mode of setting the knocking determination period Tk, the knocking determination level Vk, and the knocking detection frequency H is changed according to the change in the combustion state of the air-fuel mixture, which is caused by the change in the valve characteristic such as the working angle θ.

Figure 8:
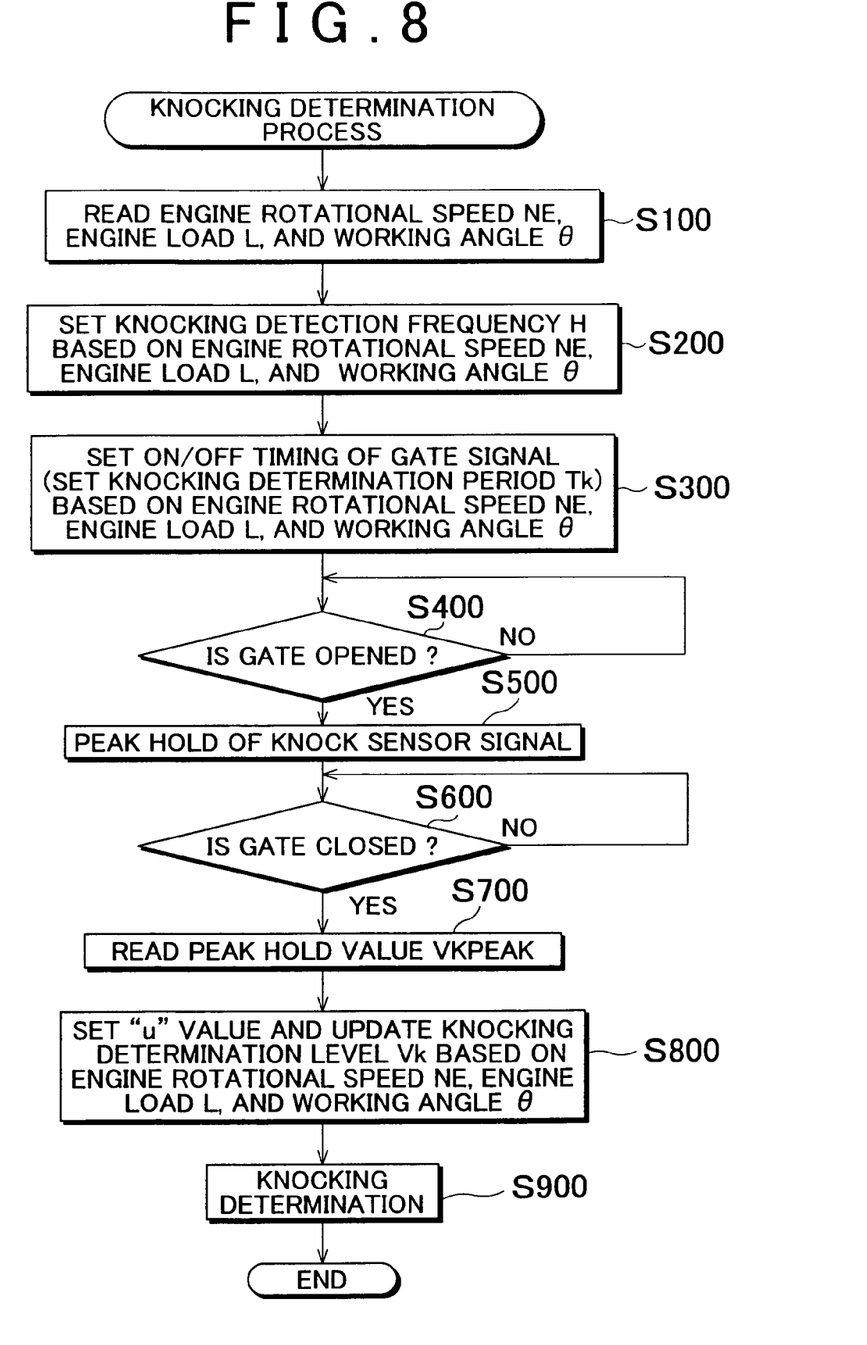
FIG. 8 is a time chart showing a procedure of the knocking determination in the embodiment of the invention.

FIG. 8 is a procedure of the knocking determination according to the embodiment. A routine shown in FIG. 8 is started when a condition for starting the knocking control is satisfied after the engine is started. In this routine, the knocking determination is performed, and the mode of the knocking determination is changed.

When the routine is started, first, the engine rotational speed NE, the engine load L, and the working angle θ are read (S100). Next, on the basis of the engine rotational speed NE, the engine load L, and the working angle θ, the knocking detection frequency H is set with reference to a knocking detection frequency setting map HMAP exemplified in FIG. 9 (S200). The knocking detection frequency setting map HMAP is stored in the memory of the electronic control unit 7 in advance. The knocking detection frequency setting map HMAP is made in a manner described below.

Figure 9:
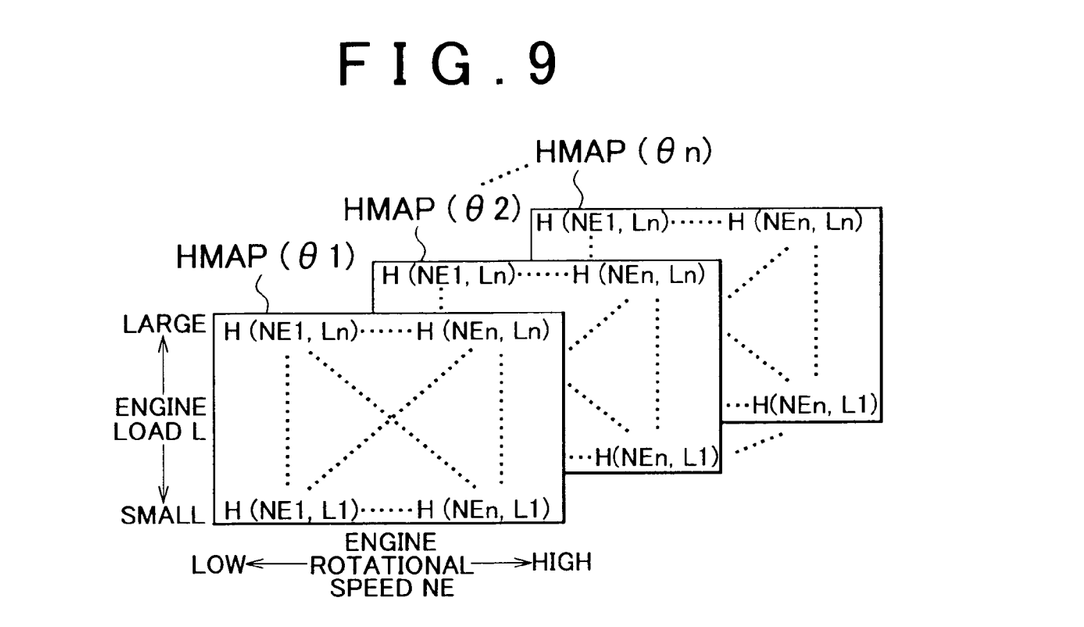
FIG. 9 is a conceptual diagram of a map used for setting a knocking detection frequency.

When the working angle θ of the intake valve 21 is changed, the combustion state of the air-fuel mixture is changed, and accordingly the vibration frequency of knocking is changed. Accordingly, in order to accurately detect the vibration frequency of knocking that is thus changed, plural knocking detection frequency setting maps HMAP corresponding to values of the working angle θ are provided. Also, since the vibration frequency of knocking is changed when the engine rotational speed NE and the engine load L are changed, values of the knocking detection frequency H corresponding to values of the engine rotational speed NE and values of the engine load L are set in each of the maps corresponding to the values of the working angle θ.

After the knocking detection frequency H is set in the aforementioned manner, next, on timing and off timing of a gate signal are set (S300). This gate signal decides a period during which the output signal from the knock sensor 79, which is related to the knocking determination, is sampled. A period during which the gate signal is on is regarded as the knocking determination period Tk.

Figure 10:
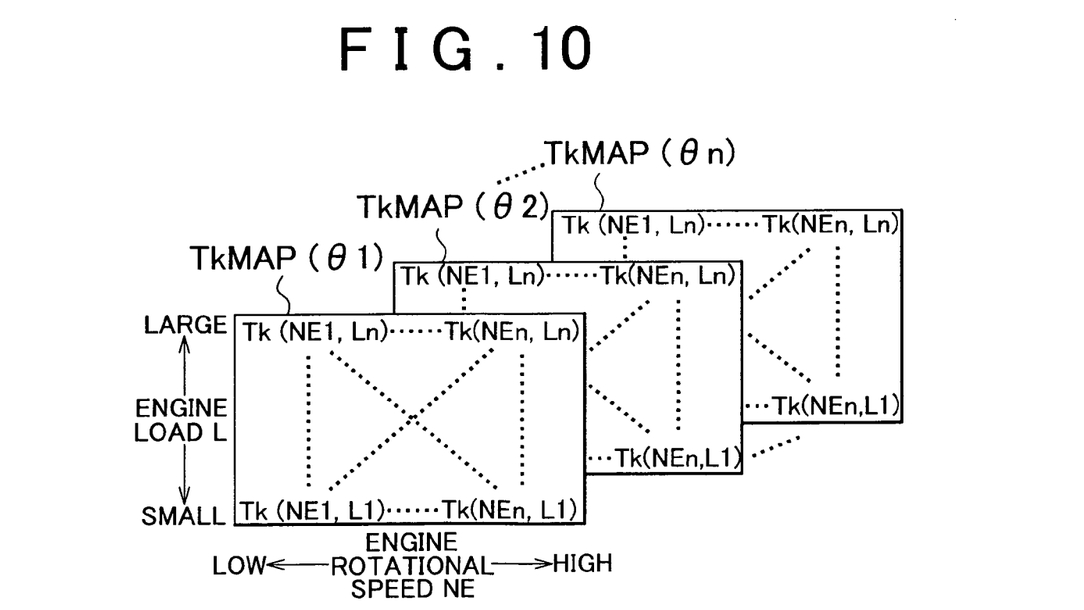
FIG. 10 is a conceptual diagram of a map used for setting a knocking determination period.

The on/off timing of the gate signal, that is, the knocking determination period Tk is set based on the engine rotational speed NE, the engine load L, and the working angle θ, with reference to a knocking determination period setting map TkMAP exemplified in FIG. 10. The knocking determination period setting map TkMAP is stored in the memory of the electronic control unit 7 in advance. The knocking determination period setting map TkMAP is made in a manner described below.

When the working angle θ of the intake valve 21 is changed, the combustion state of the air-fuel mixture is changed, and accordingly the occurrence timing of knocking is changed. Accordingly, in order to accurately detect the occurrence timing of knocking that is thus changed, plural knocking determination period setting maps TkMAP corresponding to values of the working angle θ are provided. Also, since the occurrence timing of knocking is changed when the engine rotational speed NE and the engine load L are changed, values of the knocking determination period Tk corresponding to values of the engine rotational speed NE and values of the engine load L are set in each of the maps corresponding to the values of the working angle θ. Also, the knocking determination period Tk is set such that the knocking determination period Tk does not include timing at which seating noise or the like of the intake valve 21 or the exhaust valve 22 is caused.

Figure 11:
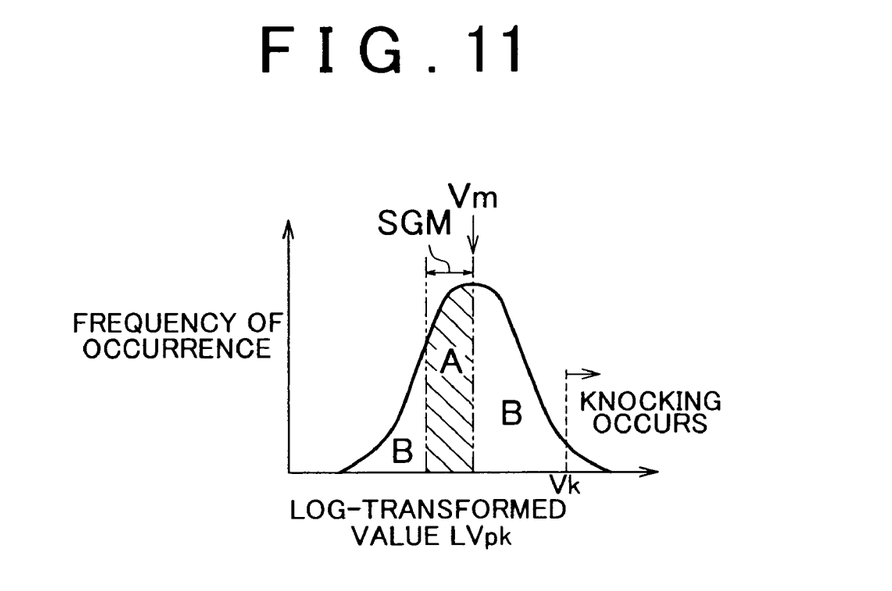
FIG. 11 is a graph showing an example of a normal distribution set in the knocking determination process.

After the knocking determination period Tk is set in the aforementioned manner, the knocking determination is performed for each cylinder in steps S400 to S900. In this embodiment, the maximum value of the output signal from the knock sensor 79 during the knocking determination period Tk is referred to as a peak hold value VKPEAK. The knocking determination is performed based on the peak hold value VKPEAK. On the assumption that a distribution of log-transformed values LVpk of the peak hold values VKPEAK is a normal distribution as shown in FIG. 11, it is determined whether knocking occurs based on a position of a present sampled log-transformed value LVpk in the normal distribution.

After the gate signal is turned on, and a gate for the knocking determination is opened (i.e., an affirmative determination is made in step S400), the peak hold of the output signal from the knock sensor 79 provided in a target cylinder is started (step S500). That is, the peak hold value VKPEAK that is the maximum value of the output signal from the knock sensor 79 is obtained during the period from when the gate signal is turned on.

When the gate signal is turned off and the gate is closed (i.e., an affirmative determination is made in step S600), the peak hold value VKPEAK at this time point, that is, the maximum value of the output signal from the knock sensor 79 during the knocking determination period Tk is read (step S700).

On the basis of the peak hold value VKPEAK, the knocking determination level Vk is updated (step S800). The knocking determination level Vk is updated in a manner described below.

First, on the basis of the log-transformed value LVpk of the present peak hold value VKPEAK that is sampled, a distribution parameter indicating a distribution tendency of the log-transformed values LVpk, that is, a distribution median value Vm and a standard deviation value SGM shown in FIG. 11 are updated. The distribution median value Vm and the standard deviation value SGM are updated according to an equation (2) to an equation (5) described below. That is, values of the distribution median value Vm and the standard deviation value SGM before updating are increased or decreased based on the log-transformed value LVpk of the present peak hold value VKPEAK that is sampled. Thus, the distribution median value Vm and the standard deviation value SGM are roughly estimated.

(In the case of LVpk>Vm)

$$Vm \leftarrow Vm + \Delta M \qquad (2)$$

(In the case of LVpk≦Vm)

$$Vm \leftarrow Vm - \Delta M \qquad (3)$$

(In the case of Vm−SGM<LVpk<Vm: In the case where LVpk is in a region A in FIG. 11)

$$SGM \leftarrow SGM - 2 \times \Delta S \qquad (4)$$

(In the case of LVpk≦Vm−SGM, or in the case of LVpk≧Vm: in the case where LVpk is in a region B in FIG. 11)

$$SGM \leftarrow SGM + \Delta S \qquad (5)$$

An update amount ΔM of the distribution median value Vm is a value obtained by dividing a difference between the present log-transformed value LVpk that is sampled and the distribution median value Vm before updating by a predetermined value n1 (for example "4"). An update amount ΔS of the standard deviation value SGM is a value obtained by dividing the update amount ΔM of the distribution median value Vm by a predetermined value n2 (for example, "8").

The knocking determination level Vk is obtained based on the distribution median value Vm and the standard deviation value SGM that are thus updated, and a "u" value, according to an equation (6) described below.

$$Vk = Vm + u \times SGM \qquad (6)$$

The "u" value is used for setting the knocking determination level Vk to an appropriate value. As the "u" value is set to a larger value, the knocking determination level Vk is set to a larger value.

Figure 12:
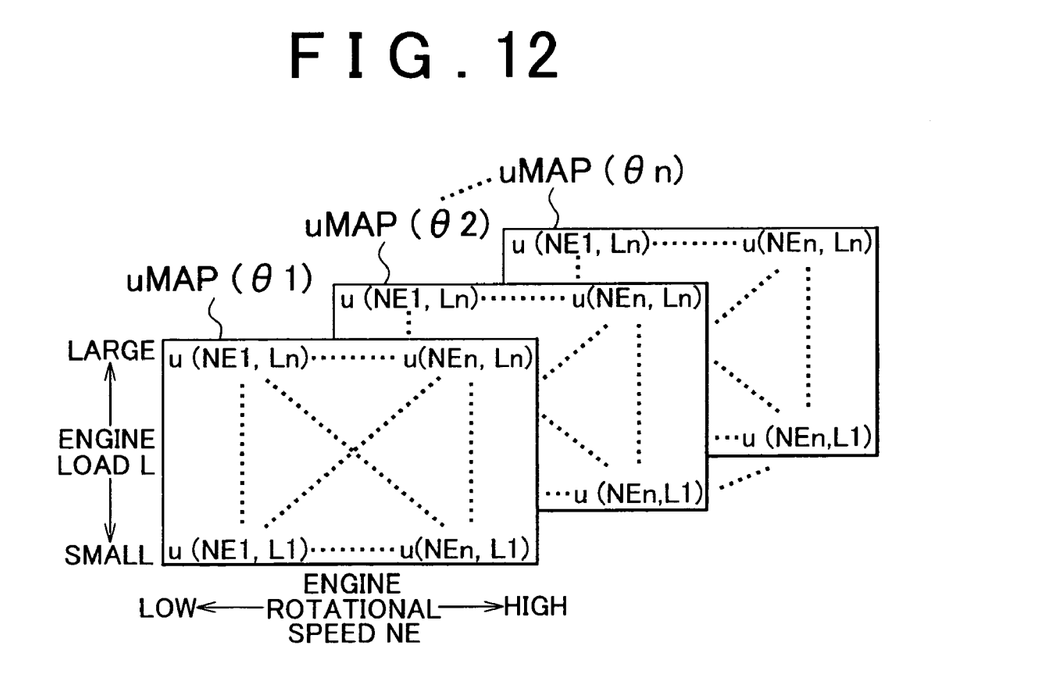
FIG. 12 is a conceptual diagram of a map used for setting a "u" value.

The "u" value is set based on the engine rotational speed NE, the engine load L, and the working angle θ, referring to a "u" value setting map uMAP exemplified in FIG. 12. The "u" value setting map uMAP is stored in the memory of the electronic control unit 7 in advance. The "u" value setting map uMAP is made in a manner described below.

When the working angle θ of the intake valve 21 is changed, the combustion state of the air-fuel mixture is changed, and accordingly the vibration level of knocking is changed. Accordingly, plural "u" value setting maps uMAP corresponding to values of the working angle θ are provided so that the knocking determination level Vk is set according to the vibration level of knocking that is thus changed, that is, the knocking determination level Vk is set to a larger value as the vibration level becomes larger. Also, since the vibration level of knocking is changed when the engine rotational speed NE and the engine load L are changed, the "u" values corresponding to values of the engine rotational speed NE and values of the engine load L are set in each of the maps corresponding to the values of the working angle θ.

After the knocking determination level Vk is updated in the aforementioned manner, next, it is determined whether knocking occurs in the engine 1 based on comparison between the knocking determination level Vk and the log-transformed value LVpk (step S900). That is, when the log-transformed value LVpk is in a range in which the knocking determination level Vk is less than the log-transformed value LVpk (knocking determination level Vk<the log-transformed value LVpk), it is determined that knocking occurs in the engine 1. When the log-transformed value LVpk is in a range in which the knocking determination level Vk is equal to or greater than the log-transformed value LVpk (knocking determination level Vk≧the log-transformed value LVpk), it is determined that knocking does not occur in the engine 1.

Thus, in this embodiment, the mode of the knocking determination is changed according to the change in the occurrence mode of knocking, which is caused by the change in the engine operating state. Particularly, the mode of the knocking determination is changed according to the change in the combustion state of the air-fuel mixture, which is caused by the change in the working angle θ of the intake valve 21. Therefore, in the engine 1 including the variable valve mechanism 3, it is possible to accurately detect occurrence of knocking, and to prevent a decrease in reliability of the result of the knocking determination. As a result, the ignition timing is appropriately delayed by correction as described above, and thus occurrence of knocking is appropriately reduced.

As described above, according to the embodiment of the invention, it is possible to obtain effects described below.

(1) When it is determined whether knocking occurs in the engine 1 including the variable valve mechanism 3 which can vary the valve characteristic of the intake valve 21, the mode of the knocking determination is changed according to the change in the combustion state of the air-fuel mixture, which is caused by the change in the valve characteristic. Therefore, even when the occurrence mode of knocking is changed due to the change in the valve characteristic, the mode of the knocking determination is changed according to the change in the occurrence mode of knocking. Accordingly, it is possible to appropriately detect occurrence of knocking in the engine 1 whose valve characteristic is variably set. Thus, it is possible to prevent a decrease in reliability of the result of the knocking determination.

(2) It is determined whether knocking occurs based on the output signal from the knock sensor 79 during the knocking determination period Tk. More specifically, with regard to the change in the mode of the knocking determination, the knocking determination period Tk is changed according to the change in the combustion state of the air-fuel mixture, which is caused by the change in the valve characteristic (working angle θ). Therefore, even when the occurrence timing of knocking is changed due to the change in the valve characteristic, the knocking determination period Tk is changed according to the change in the occurrence timing of knocking. Accordingly, it is possible to appropriately detect occurrence of knocking in the engine 1 whose valve characteristic is variably set. Thus, it is possible to prevent a decrease in reliability of the result of the knocking determination.

(3) It is determined whether knocking occurs based on comparison between the knocking determination level Vk and the output signal from the knock sensor 79. More specifically, with respect to the change in the mode of the knocking determination, the knocking determination level Vk is changed according to the change in the combustion state of the air-fuel mixture, which is caused by the change in the valve characteristic (working angle θ). Therefore, even when the vibration level of knocking is changed due to the change in the valve characteristic, the knocking determination level Vk is changed according to the change in the vibration level of knocking. Accordingly, it is possible to appropriately detect occurrence of knocking in the engine 1 whose valve characteristic is variably set. Thus, it is possible to prevent a decrease in reliability of the result of the knocking determination.

(4) It is determined whether knocking occurs based on the output signal from the knock sensor 79 at the predetermined vibration frequency. More specifically, with reference to the change in the mode of the knocking determination, the predetermined vibration frequency, that is, the knocking detection frequency H is changed according to the change in the combustion state of the air-fuel mixture, which is caused by the change in the valve characteristic (working angle θ). Therefore, even when the vibration frequency of knocking is changed due to the change in the valve characteristic, the knocking detection frequency H is changed according to the change in the vibration frequency of knocking. Accordingly, it is possible to appropriately detect occurrence of knocking in the engine 1 whose valve characteristic is variably set. Thus, it is possible to prevent a decrease in reliability of the result of the knocking determination.

(5) The ignition timing is delayed by correction based on the result of the knocking determination. According to the knocking determination process, it is possible to prevent a decrease in reliability of the result of the knocking determination. Therefore, the ignition timing can be appropriately delayed by correction, and thus occurrence of knocking can be appropriately reduced.

The following modifications can be made to the aforementioned embodiment.

In the aforementioned embodiment, the knocking determination period Tk, the knocking detection frequency H, and the knocking determination level Vk are set based on the working angle θ. However, the knocking determination period Tk, the knocking detection frequency H, and the knocking determination level Vk may be set based on another valve characteristic, for example, any one of the lift amount, the valve opening timing, and the valve closing timing of the intake valve 21.

In the aforementioned embodiment, each of the knocking determination period Tk, the knocking detection frequency H, and the "u" value is obtained using the map. However, each of the knocking determination period Tk, the knocking detection frequency H, and the "u" value may be obtained using a function expression.

In the aforementioned embodiment, each of the knocking determination period, the knocking detection frequency, and the knocking determination level ("u" value) is changed according to the working angle θ. At least one of the knocking determination period, the knocking detection frequency, and the knocking determination level ("u" value) may be changed according to the working angle θ. In this case as well, the mode of the knocking determination is changed according to the change in the occurrence mode of knocking, which is caused by the change in the valve characteristic. Accordingly, it is possible to appropriately detect occurrence of knocking in the engine 1 whose valve characteristic is variably set. Thus, it is possible to prevent a decrease in reliability of the result of the knocking determination.

In the aforementioned embodiment, the rotational phase R of the driving motor 51 is detected by the position detection sensor 55. In this regard, the most important thing is to detect the valve characteristic of the intake valve 21, which is changed by the variable valve mechanism 3. Therefore, a rotational phase of a member which is rotated by the driving motor 51 may be detected, or the position of the control shaft 46, that is, an amount of movement of the control shaft 46 may be detected.

In the aforementioned embodiment, the valve characteristic that can be varied includes the lift amount and the working angle of the intake valve 21. However, even in a case where at least one of the lift amount, the working angle, the valve opening timing, and the valve closing timing can be varied, the invention can be applied. In this case as well, the same effects can be obtained by changing the mode of the knocking determination according to the change in the combustion state of the air-fuel mixture, which is caused by the change in the valve characteristic.

In the aforementioned embodiment, description has been made of the case where the invention is applied to the engine 1 including the variable valve mechanism 3 which includes the so-called rocker arm type valve system, and in which the oscillation mode of the rocker arm is changed. Meanwhile, the invention can be applied to an internal combustion engine including a direct-acting valve system which directly opens/closes the intake valve 21 using the intake cam shaft 23, and a variable valve mechanism in which the rotational phase of the intake cam shaft 23 is changed, for example, a vane type variable valve timing mechanism or a helical gear type variable valve timing mechanism in which relative phases of the intake cam shaft 23 and the crank shaft are changed. Also, the invention can be applied to an internal combustion engine including the rocker arm type valve system and such a variable valve timing mechanism. In a case where an internal combustion engine includes such a variable valve timing mechanism, the operating state of the variable valve mechanism (variable valve timing mechanism), that is, the valve characteristic of the intake valve 21 can be detected by detecting the rotational phase of the intake cam shaft 23 using a sensor or the like.

Also, the invention can be applied to a case where the intake cam 27 is a so-called three-dimension cam whose cam profile changes in an axial direction of the cam shaft, and the variable valve mechanism changes the valve characteristic of the intake valve by moving the three-dimension cam in the axial direction of the cam shaft. In this case, the valve characteristic of the intake valve 21 can be detected by detecting an amount of movement of the three-dimension cam, that is, a position of the three-dimension cam using a sensor or the like.

In the aforementioned embodiment, occurrence of knocking is reduced by correcting the ignition timing. However, the invention can be applied to a knocking control apparatus which reduces occurrence of knocking by changing another engine control amount, for example, an intake air amount or a fuel injection amount.

In the aforementioned embodiment or modified examples, the invention can be applied to a case where a valve characteristic of the exhaust valve 22 is changed, or a case where the valve characteristics of the intake valve 21 and the exhaust valve 22 are changed.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A knocking control apparatus for an internal combustion engine, which is applied to an internal combustion engine including a variable valve mechanism that can vary a valve characteristic of at least one of an intake valve and an exhaust valve, and which changes an engine control amount based on a result of a knocking determination as to whether knocking occurs, the knocking control apparatus comprising:

a controller which performs the knocking determination as to whether knocking occurs based on an output signal from a knock sensor that detects a vibration occurring in the internal combustion engine, and which changes a mode of the knocking determination according to a change in a combustion state of an air-fuel mixture, the change being caused by a change in the valve characteristic, wherein the controller performs the knocking determination as to whether knocking occurs based on the output signal from the knock sensor at a predetermined vibration frequency, and the controller changes the vibration frequency according to the change in the combustion state of the air-fuel mixture, which is caused by the change in the valve characteristic.

2. The knocking control apparatus for an internal combustion engine according to claim 1, wherein the controller performs the knocking determination as to whether knocking occurs based on the output signal from the knock sensor during a predetermined knocking determination period, and the controller changes the knocking determination period according to the change in the combustion state of the air-fuel mixture, which is caused by the change in the valve characteristic.

3. The knocking control apparatus for an internal combustion engine according to claim 2, wherein the knocking determination period is obtained based on a map that is made in advance, or a function expression that is made in advance.

4. The knocking control apparatus for an internal combustion engine according to claim 1, wherein the controllers performs the knocking determination as to whether knocking occurs based on a comparison between a predetermined knocking determination level and the output signal from the knock sensor, and the controller changes the knocking determination level according to the change in the combustion state of the air-fuel mixture, which is caused by the change in the valve characteristic.

5. The knocking control apparatus for an internal combustion engine according to claim 4, wherein the knocking determination level is obtained based on a map that is made in advance, or a function expression that is made in advance.

6. The knocking control apparatus for an internal combustion engine according to claim 1, wherein the vibration frequency is obtained based on a map that is made in advance, or a function expression that is made in advance.

7. The knocking control apparatus for an internal combustion engine according to claim 1, wherein the valve characteristic that can be varied includes at least one of a lift amount, a working angle, valve opening timing, and valve closing timing of at least one of the intake valve and the exhaust valve.

8. The knocking control apparatus for an internal combustion engine according to claim 1, wherein the engine control amount that is changed is ignition timing, and the ignition timing is delayed by correction when the controller determines that knocking occurs.

9. A knocking control method for an internal combustion engine, which is applied to an internal combustion engine including a variable valve mechanism that can vary a valve characteristic of at least one of an intake valve and an exhaust valve, and which includes changing an engine control amount based on a result of a knocking determination as to whether knocking occurs, the knocking control method comprising:

performing the knocking determination as to whether knocking occurs based on an output signal from a knock sensor that detects a vibration occurring in the internal combustion engine; and changing a mode of the knocking determination according to a change in a combustion state of an air-fuel mixture, the change being caused by a change in the valve characteristic, wherein the knocking determination as to whether knocking occurs is performed based on the output signal from the knock sensor at a predetermined vibration freguency, and the vibration freguency is changed according to the change in the combustion state of the air-fuel mixture, which is caused by the change in the valve characteristic.

10. The knocking control method for an internal combustion engine according to claim 9, wherein the knocking determination as to whether knocking occurs is performed based on the output signal from the knock sensor during a predetermined knocking determination period, and the knocking determination period is changed according to the change in the combustion state of the air-fuel mixture, which is caused by the change in the valve characteristic.

11. The knocking control method for an internal combustion engine according to claim 10, wherein the knocking determination period is obtained based on a map that is made in advance, or a function expression that is made in advance.

12. The knocking control method for an internal combustion engine according to claim 9, wherein the knocking determination as to whether knocking occurs is performed based on a comparison between a predetermined knocking determination level and the output signal from the knock sensor, and the knocking determination level is changed according to the change in the combustion state of the air-fuel mixture, which is caused by the change in the valve characteristic.

13. The knocking control method for an internal combustion engine according to claim 12, wherein the knocking determination level is obtained based on a map that is made in advance, or a function expression that is made in advance.

14. The knocking control method for an internal combustion engine according to claim 9, wherein the vibration frequency is obtained based on a map that is made in advance, or a function expression that is made in advance.

15. The knocking control method for an internal combustion engine according to claim 9, wherein the valve characteristic that can be varied includes at least one of a lift amount, a working angle, valve opening timing, and valve closing timing of at least one of the intake valve and the exhaust valve.

16. The knocking control method for an internal combustion engine according to claim 9, wherein the engine control amount that is changed is ignition timing, and the ignition timing is delayed by correction when it is determined that knocking occurs.

* * * * *